United States Patent
Alfano

[15] 3,675,873
[45] July 11, 1972

[54] CINEMATOGRAPHIC APPARATUS

[72] Inventor: Marco Alfano, Turin, Italy

[73] Assignee: Silma, Turin, Italy

[22] Filed: Sept. 15, 1970

[21] Appl. No.: 72,285

[30] Foreign Application Priority Data

Sept. 18, 1969 Germany...................P 19 47 149.9

[52] U.S. Cl.............................242/192, 242/197, 242/205
[51] Int. Cl. .................G03b 23/04, B65h 17/14, G03b 1/02
[58] Field of Search.................242/197, 198, 68.3, 192, 207, 242/206, 208, 209, 210, 205, 71.1

[56] References Cited

UNITED STATES PATENTS

| | | | |
|---|---|---|---|
| 3,275,253 | 9/1966 | Cherniavskys.....................242/197 X |
| 3,337,147 | 8/1967 | Soong et al. ......................242/68.3 X |
| 3,468,498 | 9/1969 | Bunting..............................242/207 |
| 3,542,310 | 11/1970 | Keznecki..............................242/192 |

*Primary Examiner*—George F. Mautz
*Attorney*—Michael S. Striker

[57] ABSTRACT

A motion picture projector wherein the core of the takeup reel can be connected with the leader of motion picture film which is stored on a supply reel confined in a magazine which is removably mounted on the housing of the projector or with the leader of film which is stored on an unconfined supply reel. The magazines which can be used with the projector are of the type having a fixedly mounted stub for the core of the supply reel therein, and each such magazine has a window which permits entry of a friction wheel serving to rewind the film onto the supply reel when the motor which normally drives the takeup real is operated in reverse. The unconfined supply reels are to be mounted on a spindle which can be driven by the motor when the latter is operated in reverse. Such spindle can be mounted coaxially with a spindle for the takeup reel or adjacent to the space for reception of magazines so that a properly inserted magazine can disengage a clutch in the transmission which drives the spindle for unconfined supply reels.

9 Claims, 3 Drawing Figures

INVENTOR
Marco ALFANO

By
his ATTORNEY

INVENTOR
Marco ALFANO

By his ATTORNEY 3,675,873

CINEMATOGRAPHIC APPARATUS

BACKGROUND OF THE INVENTION

The present invention relates to cinematographic apparatus in general, and more particularly to improvements in motion picture projectors. Still more particularly, the invention relates to improvements in motion picture projectors which can accept supply reels of different sizes.

It is already known to employ in connection with a motion picture projector a film magazine or container which can accommodate larger or smaller supply reels for developed motion picture film. As a rule, the core of the thus inserted supply reel is mounted on a stud which is integral with or rigidly secured to the rear wall of the magazine. The projector is equipped with a drive which can be actuated to rewind the film onto the supply reel; such drive comprises a driving member which can enter the magazine by way of a window and engages the flange or flanges of the supply reel to rotate the latter in a direction to draw film from the takeup reel and to convolute it on the core of the supply reel. The present invention relates to improvements in motion picture projectors of the just outlined character.

A drawback of presently known motion picture projectors for use with magazines is that they cannot accept supply reels which are not confined in a magazine, i.e., that, in order to be used in such a projector, a supply reel must be installed in a magazine before it can be mounted in or on the projector. Presently known motion picture projectors of the just outlined character cannot properly support an unconfined supply reel because they are merely provided with a holder, carrier, retainer or a like device which can properly accommodate a magazine but not an unconfined supply reel. On the other hand, the capability to properly support an unconfined supply reel would contribute significantly to the versatility and sales appeal of a projector which is used with magazines for supply reels.

SUMMARY OF THE INVENTION

An object of the invention is to provide a motion picture projector which can accept unconfined supply reels as well as such supply reels which are installed in magazines.

Another object of the invention is to provide a projector which can accept magazines of different sizes or unconfined supply reels of different sizes.

A further object of the invention is to provide a motion picture projector which can accept confined or unconfined supply reels for motion picture film with novel and improved means for supporting such supply reels and with novel and improved means for rewinding the film onto such supply reels.

An additional object of the invention is to provide a motion picture projector wherein at least some parts which can rewind film onto an unconfined supply reel can also serve to rewind film onto a supply reel which is confined in a magazine or a like container.

Still another object of the invention is to provide a projector wherein the drive which rewinds the film onto an unconfined supply reel is rendered ineffective in a fully automatic way when the projector accommodates a supply reel which is confined in a magazine.

A further object of the invention is to provide a motion picture projector wherein the mechanism which renders it possible to employ confined or unconfined supply reels occupies little room and comprises a relatively small number of simple and rugged parts.

The invention is embodied in a cinematographic apparatus, particularly in a motion picture projector for use with unconfined supply reels for motion picture film or with supply reels which are confined in magazines. The apparatus comprises a housing, receiving means provided on the housing for removably supporting magazines with supply reels confined therein, preferably for removably supporting magazines of two or more sizes, drive means provided in or on the housing for rotating the supply reel in a magazine which is located in the receiving means in a direction to collect the film on such supply reel, at least one spindle which is rotatably mounted on the housing to support unconfined supply reels, preferably to support unconfined supply reels of different diameters, a prime mover (preferably a reversible electric motor) which can operate the drive means, and transmission means receiving motion from the prime mover and arranged to rotate the spindle and an unconfined supply reel thereon in a direction to collect the film on the core of such supply reel.

The spindle may be installed coaxially with a takeup reel which can be driven by the prime mover and is connectable with the leader of a film which is stored on the supply reel in a magazine located in the receiving means or on a supply reel which is supported by the spindle. In accordance with another embodiment of the invention, the spindle can be mounted on the housing at a point which is remote from the takeup reel, for example, in such a way that its holder or bearing is adjacent to the receiving means whereby a magazine which is placed into the receiving means can disengage a clutch in the transmission means to prevent rotation of the spindle when the receiving means accommodates a magazine.

The novel features which are considered as characteristic of the invention are set forth in particular in the appended claims. The improved cinematographic apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
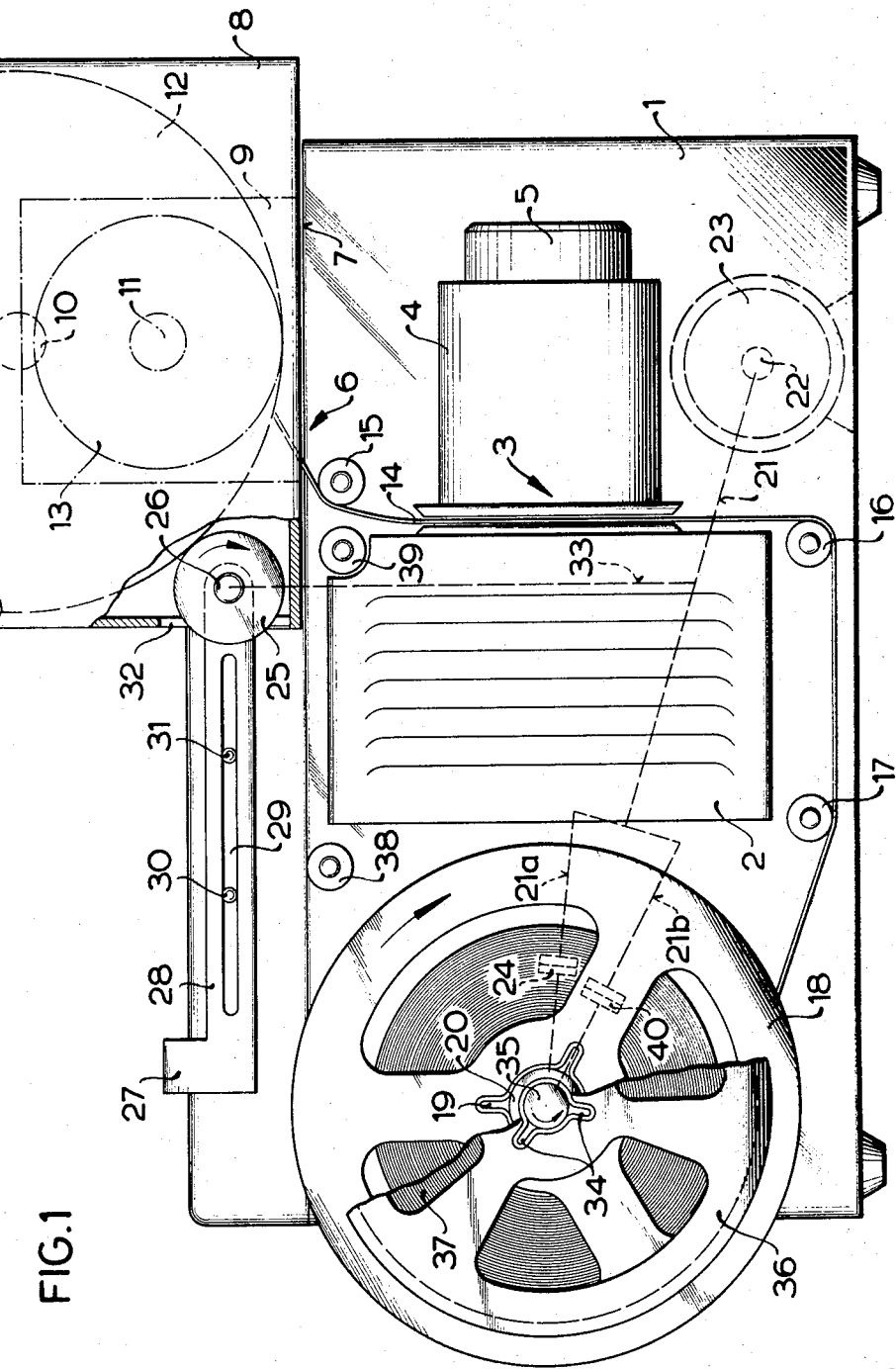
FIG. 1 is a schematic side elevational view of a motion picture projector which embodies the invention.

Referring first to FIG. 1, the numeral 1 denotes the housing of a motion picture projector which further includes a projection lamp casing 2, a film gate 3 which is located in front of the casing 2, and a projection lens 5 which is axially movably mounted in a sleeve 4 located in front of the gate 3. The assembly of parts 2 to 5 is located at a level below a receiving means 6 for magazines 8 or 9 containing different lengths of convoluted motion picture film. Each magazine has a rear wall provided with a rigidly mounted non-rotatable stub or projection (see the stubs 10, 11 of the magazines 8, 9) which supports a rotatable supply reel (12, 13) for motion picture film. It will be noted that the diameter of the supply reel 12 exceeds substantially the diameter of the supply reel 13, i.e., the supply reel 12 can store a substantially greater length of motion picture film. For example, the smaller supply reel 13 can store up to 50 feet of film and the larger supply reel 12 can store up to 400 feet of film.

The motion picture film 14 which is drawn from the supply reel 12 or 13 (for example, from the supply reel 12) is trained over a guide roll 15 and passes through the gate 3 behind the projection lens 5 to thereupon travel over additional guide rolls 16, 17. The leader of the film 14 is connected to the core of a takeup reel 18 which is mounted on a hollow sleeve-like spindle 20 by means of suitable elastic torque transmitting members 19. The spindle 20 is driven by the output shaft 22 of a prime mover here shown as a reversible electric motor 23 through the intermediary of a transmission having branches 21, 21a which are indicated by broken lines (such transmission may include a gear train or a belt drive). When the motion picture projector is in use, the film 14 is drawn from the supply reel 12 because the motor 23 rotates its shaft 22 in a forward direction so that the branches of the transmission 21, 21a drive the spindle 20 in a clockwise direction as indicated by the arrow. The branch 21a of the transmission between the output shaft 22 and the spindle 20 contains a one-way clutch 24 of known design to insure that the spindle 20 is not driven when the motor 23 is caused to rotate its shaft 22 in the opposite (reverse) direction. The shaft 22 rotates in such reverse or rearward direction when the user operates the projector to rewind the film 14 onto the supply reel 12. The takeup reel 18 then rotates in response to a pull which is exerted by the film 14 whereby the reel 18 rotates in a counterclockwise direction.

The drive means for rotating the supply reel 12 or 13 in a direction to collect the film thereon comprises a friction wheel 25 which is mounted on the shaft 26 of a carriage 28. The shaft 26 can be driven by a second transmission 33 which can but need not derive motion from the branch 21 of the first transmission, i.e., the transmission 33 can derive motion directly from the output shaft 22 of the motor 23 when the latter is operated in reverse. The carriage 28 is reciprocably arranged in suitable ways on the housing 1 to move substantially tangentially of the supply reel 12 or 13 and to move the friction wheel 25 into engagement with the flange or flanges of the supply reel in the magazine 8 or 9. The numeral 27 denotes a handgrip portion of the carriage 28; this handgrip portion is engaged by hand when the carriage 28 is to be withdrawn in a direction to the left, as viewed in FIG. 1, so as to move the friction wheel 25 away from the flanges on the supply reel in the magazine 8 or 9. The carriage 28 has an elongated slot 29 for guide pins 30, 31 which are mounted on the housing 1. These guide pins restrict the carriage 28 to a reciprocatory movement in parallelism with the optical axis of the projection lens 5.

Each of the magazines which are to be used with the projector of FIG. 1 is provided in one of its end walls with a relatively small window (see the window 32 in the left-hand end wall of the magazine 8) which is preferably just large enough to permit entry or withdrawal of the friction wheel 25 so that the latter can be readily moved against or away from the flanges of the respective supply reel. The carriage 28 can be biased against the supply reel of the inserted magazine 8 or 9 by one or more springs (not shown), or its handgrip portion 27 is simply pushed to the right, as viewed in FIG. 1, when the direction of rotation of the motor 23 is reversed so that the branch 21 and the transmission 33 drive the friction wheel 25 in a clockwise direction; such rotation of the friction wheel 25 results in a counterclockwise rotation of the supply reel 12 or 13 whereby the supply reel collects the film 14 which is being paid out by the takeup reel 18 on the spindle 20. The transmission 33 may also contain a one-way clutch (not shown) which is operative only when the motor 23 is operated in reverse so that the friction wheel 25 is not driven when the motor 23 rotates the spindle 20. A magazine 8 or 9 which is properly located in the receiving means 6 rests on a bottom wall 7.

In order to insure that the projector of FIG. 1 can also be used for projection of images on developed motion picture film which is not stored on supply reels which are confined in magazines, the motor 23 can drive a second spindle 35 which is coaxial with and is surrounded by the hollow sleevelike spindle 20. The spindle 35 extends forwardly or outwardly beyond the spindle 20 and is provided with customary torque transmitting members 34 which can rotate an unconfined supply reel 36 for developed motion picture film. This supply reel 36 is used when the magazine 8 or 9 is removed from the receiving means 6. FIG. 1 shows that the diameter of the supply reel 36 is somewhat less than the diameter of the takeup reel 18; however, it is clear that the spindle 35 can support unconfined supply reels which are much larger than the takeup reel 18 or much smaller than the supply reel 36.

The spindle 35 is driven by the motor 23 when the latter is operated in reverse. The transmission between the output shaft 22 and the spindle 35 comprises the branch 21 of the first transmission and a branch 21b which contains a one-way clutch 40. The clutch 40 transmits torque only when the motor 23 is operated in reverse, i.e., when the spindle 20 is not driven by the clutch 24. When the projector is to project images of frames on the film which is stored on the unconfined supply reel 36, such film is trained over further guide rolls 38, 39, is thereupon caused to pass through the gate 3, around the guide rolls 16, 17, and its leader is connected to the core of the takeup reel 18. It will be noted that the branch 21b transmits torque only when the branch 21a is ineffective, or vice versa. However, it is equally within the purview of the invention to provide a separate transmission which receives torque directly from the output shaft 22 and drives the spindle 35 when the motor 23 is operated in reverse.

Figure 2:
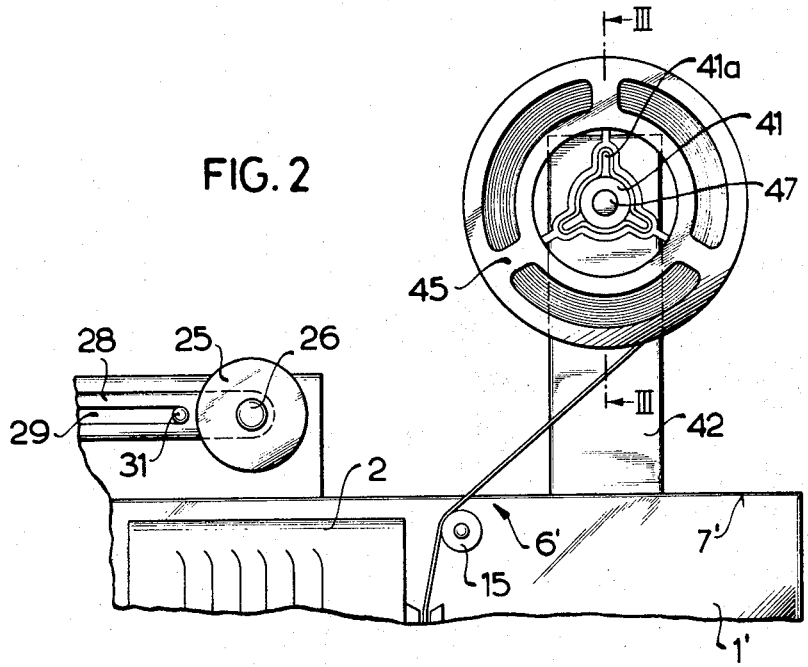
FIG. 2 is a fragmentary schematic side elevational view of a second motion picture projector.
Figure 3:
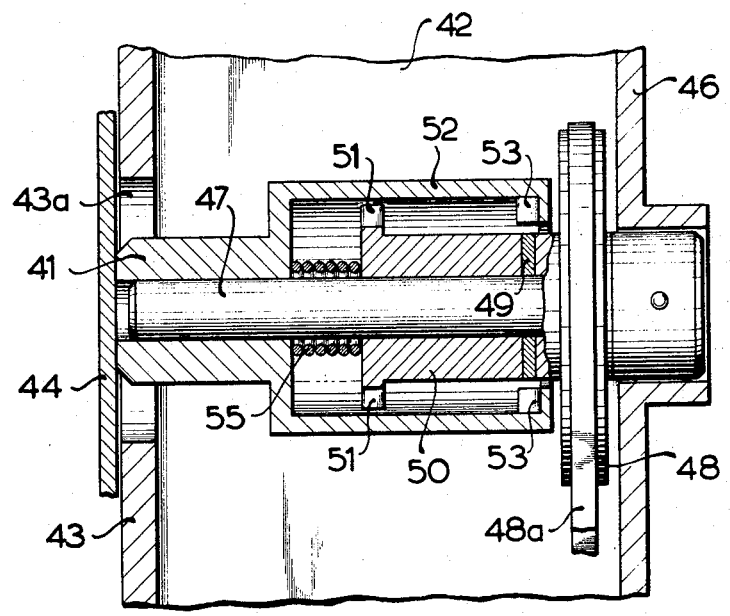
FIG. 3 is an enlarged fragmentary sectional view as seen in the direction of arrows from the line III—III of FIG. 2.

FIG. 2 and 3 illustrate a portion of a second motion picture projector wherein the spindle 41 for supply reels which are not mounted in magazines is remote from and is not coaxial with the spindle 20 (not shown) for the takeup reel 18. The spindle 41 is mounted on an upwardly extending hollow arm or holder 42 which can form part of receiving means 6' for magazines, not shown. The arm 42 is rigidly secured to the housing 1' of the projector. The distance between the axis of the spindle 41 and the bottom wall 7' of the receiving means 6' for magazines is such that the rear wall of a magazine can shift the spindle 41 axially into the arm 42 when a small, large or medium-sized magazine is properly mounted in the means 6'. FIG. 3 shows the rear wall 44 of a magazine which is assumed to be properly installed and held in the receiving means 6' so that it rests on the bottom wall 7'; it will be seen that the wall 44 abuts against the front wall 43 of the arm 42 and bears against the outer end portion of the spindle 41 to maintain the latter in the interior of the hollow arm against the opposition of a helical spring 55.

FIG. 2 shows that the spindle 41 carries a rather small supply reel 45 whose flanges have radii much smaller than the distance between the bottom wall 7' and the axis of the spindle 41. Also, the flanges of the small supply reel 45 are located above the path for the friction wheel 25 so that the supply reel 45 cannot be driven in the same way as the supply reel in a magazine, i.e., in response to rotation of the friction wheel 25. The spindle 41 has torque transmitting portions 41a which can enter complementary sockets of the core on the supply reel 45 so that the latter can be driven when the spindle 41 rotates in a direction to wind the film onto the core of the supply reel 45, i.e., when the motor (not shown) is operated in reverse.

FIG. 3 shown that the rear wall 46 of the hollow arm 42 supports a non-ratatable shaft 47 which is coaxial with the spindle 41. A pulley 48 rotatably mounted on the shaft 47 can be driven by an endless belt 48a. The belt 48a is assumed to drive the pulley 48 whenever the motor is in operation; therefore, the arm 42 accommodates a conventional oneway clutch 49 which is installed between the pulley 48 an a first element 50 of a claw clutch so that the latter is driven by the pulley 48 only when the motor is operated in reverse. When the motor is operated in a forward direction, the pulley 48 rotates but the element 50 is at a standstill. The driving connection between the pulley 48 and the spindle 41 comprises the aforementioned claw clutch the first element 50 of which is rotatably arranged on the shaft 47 and a second element 52 of which is rigid with the spindle 41. The clutch elements 50, 52 are respectively provided with claws 51, 53 which engage each other when the spring 55 is permitted to expand, i.e., when the wall 44 of a magazine is removed from the receiving means 6' so that the spring 55 can propel the spindle 41 outwardly to the extended position shown in FIG. 2 It will be noted that the spindle 41 is a hollow sleeve which is slidable on the outer part of the shaft 47. When the spring 55 is free to expand, the spindle 41 is expelled through an opening 43a in the front wall 43 of the arm 42 and its outwardly extending portion is long enough to properly support and drive a supply reel, such as the reel 45 of FIG. 2. The spring 55 reacts against the clutch element 50 and bears against an internal shoulder of the spindle 41. The remaining parts of the projector shown in FIGS. 2 and 3 can be constructed in the same way as shown in FIG. 1; however, the guide rolls 38, 39 can be omitted because the film which is convoluted on the supply reel 45 can be threaded through the projector in the same way as a film which is stored in a magazine resting on the bottom wall 7'.

The clutch including the clutch elements 50, 52 and claws 51, 53 insures that the spindle 41 cannot be driven by the motor when the receiving means 6' accommodates a magazine for a supply reel. Thus, as soon as a magazine, such as the magazine including the wall 44 shown in FIG. 3, is properly installed in the receiving means 6', the spindle 41 is moved to its depressed or concealed position whereby the claws 53 move away from the claws 51 and the motor cannot rotate the spindle 41 even if such motor is operated in reverse. However, the motor can drive the friction wheel 25 which can be introduced into a magazine which is located in the receiving means 6' so that the friction wheel can rotate the supply reel in the magazine in a direction to collect the film.

The switch means (not shown) for arresting the motor, for causing the motor to operate in a forward direction or for causing the motor to operate in a rearward direction are of known design. The projector further comprises customary means for moving the projection lens 5 axially, for turning on or off the projection lamp, for preventing uncontrolled or unintentional removal of a magazine from the receiving means 6 or 6', and other devices which are well known and whose construction forms no part of the present invention. Also, the projector can be provided with means for automatically threading the leader of the film which is stored on a supply reel in the magazine located in the receiving means 6 or 6', and/or for automatically threading the leader of a film which is stored on an unconfined supply reel (on the spindle 35 or 41).

An important advantage of the improved projector is that it can be used with magazines of different sizes or with unconfined supply reels of any desired practical size. Another advantage of the projector is that it is provided with separate transmissions for rewinding of film which is to be stored in a magazine and for rewinding of film which is to be stored on an unconfined supply reel. This enables the designer to utilize a wide variety of transmissions and to mount them in the space which is best suited for their installation. The transition from operation with film which is stored in magazines to operation with film which is stored on unconfined supply reels or vice versa is extremely simple, and such manipulations can be performed by unskilled persons without any danger of damaging the projector. The user need not be concerned with the size of magazines or unconfined supply reels because the projector is preferably designed to accept all available normal magazines or supply reels. The transition from operation with magazines to operation with unconfined supply reels does not necessitate any exchange of spindles as in certain presently known convertible projectors. For example, if the user wishes to replace the magazine 8, 9 or 44 with a supply reel 36 or 45, the supply reel is simply slipped onto the spindle 35 or 41 and the leader of the film is threaded through the projector to be attached to the core of the takeup reel 18; the projector is then ready for use.

It is clear that the improved projector is susceptible of many additional modifications without departing from the spirit of the present invention. For example, the drive means including the friction wheel 25 of FIG. 2 can be mounted in such a way that it is capable of rotating at least certain sizes of supply reels on the spindle 41; this renders it possible to dispense with the transmission including the belt 48a, pulley 48 and one-way clutch 49. However, it was found that the versatility of the improved projector is substantially enhanced if the projector comprises a discrete transmission which can rotate unconfined supply reels in a direction to collect the motion picture film. Thus, the novel projector embodies two particularly advantageous features, namely, a discrete spindle 35 or 41 for unconfined supply reels and a discrete transmission which can rotate an unconfined supply reel on the spindle 35 or 41 in a direction to collect the film. Due to the provision of a discrete transmission for the spindle which supports unconfined supply reels, such spindle can be mounted at any desired point of the projector housing, for example, coaxially with the spindle 20 for the takeup reel 18 as shown in FIG. 1 or at a point which is remote from the takeup reel (FIGS. 2 and 3). Also, and referring to FIG. 2, the spindle 41 need not be mounted in such a way that an unconfined supply reel thereon would have to be rotated by the friction wheel 25; this renders it possible to place the spindle 41 at such a distance from the bottom wall 7' in the receiving means 6' that the spindle can support extra large or extra small supply reels. However, it is equally within the purview of the present invention to provide the housing of the projector with two or more spindles for unconfined supply reels and to mount at least one of these spindles in such a way that an unconfined supply reel thereon can be rotated by the friction wheel 25 of FIG. 2. Also, a single spindle 41 can be mounted on a holder which is movable up and down so that the thus mounted spindle can support giant or minute unconfined supply reels and can be moved to a position in which an unconfined supply reel thereon can be rotated by the friction wheel 25. The construction shown in FIGS. 2 and 3, wherein the spindle 41 is driven by a discrete transmission, other than that which includes the friction wheel 25, is preferred at this time because the holder 42 can be fixedly mounted on the housing 1' or is merely pivotable with reference to the housing to be capable of assuming a collapsed position when the projector is not in use. Also, a single spindle suffices to support unconfined supply reels of any practical size and the transmission including the parts 48, 48a, 49 renders it possible to drive the spindle 41 independently of the friction wheel 25 to thus allow for mounting of the spindle in a position which is most desirable in a particular projector. The operator of the projector need not be concerned with the spindle 41; this spindle is ready to accept an unconfined supply reel as soon as a magazine is removed from the receiving means 6', and the spindle is depressed and concealed (and its transmission rendered inoperative) in automatic response to placing of a magazine into the receiving means. An advantage of the embodiment shown in FIG. 1 is that the spindle 35 and an unconfined supply reel thereon require very little extra room. On the other hand, the embodiment of FIGS. 2–3 exhibits the important advantage that the guide elements (rolls 15, 16, 17) which serve to guide a film that is being paid out by a supply reel in a magazine can also serve to guide the entire length of film which extends between the takeup reel 18 and a supply reel on the spindle 41. Thus, the additional guide rolls 38, 39 of FIG. 1 can be omitted.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended.

1. In a cinematographic apparatus, particularly in a motion picture projector for use with unconfined supply reels for motion picture film and with supply reels which are confined in magazines of the type having a window to afford access to the supply reel therein, a combination comprising a housing; receiving means provided on said housing for removably supporting magazines with supply reels confined therein; a prime mover; drive means provided on said housing and arranged to rotate he supply reel in a magazine which is located in said receiving means in a direction to collect the film said drive means comprising a rotary member movable through the window in the magazine which is located in said receiving means to engage and rotate the supply reel in such magazine and first transmission means receiving motion from said prime mover and arranged to rotate said rotary member; at least one spindle rotatably mounted on said housing and arranged to support unconfirmed supply reels; and second transmission means receiving motion from said prime mover and arranged to rotate said spindle and an unconfined supply reel thereon in a direction to collect the film.

2. A combination as defined in claim 1 wherein said receiving means is arranged to hold magazines of different sizes and wherein said spindle is positioned on said housing in such a way that it can support and rotate unconfined supply reels of different diameters.

3. A combination as defined in claim 1, wherein said housing comprises a rear portion provided with a holder and wherein said spindle is rotatably mounted on said holder.

4. A combination as defined in claim 1 wherein said prime mover comprises a reversible motor and further comprising a takeup reel rotatably mounted on said housing and connectable with the leader of a film which is stored on a supply reel in a magazine located in said receiving means or on an unconfined supply reel on said spindle, and third transmission means receiving motion from said motor when the latter is operated in a forward direction to thereby rotate said takeup reel in a direction to collect the film thereon, said second transmission means being arranged to rotate said spindle when the motor is operated in a rearward direction and said first transmission means being arranged to rotate a supply reel in a magazine located in said retaining means when the motor is operated in said reverse direction.

5. In a cinematographic apparatus, particularly in a motion picture projector for use with unconfined supply reels for motion picture film and with supply reels which are confined in magazines, a combination comprising a housing; receiving means provided on said housing for removably supporting magazines with supply reels confined therein; drive means provided on said housing and arranged to rotate the supply reel in a magazine which is located in said receiving means in a direction to collect the film; at least one spindle rotatably mounted on said housing and arranged to support unconfined supply reels; a prime mover; transmission means receiving motion from said prime mover and arranged to rotate said spindle and an unconfined supply reel thereon in a direction to collect the film; and a takeup reel rotatably mounted on said housing and connectable with the leader of the film which is stored on a supply reel in a magazine held by said receiving means or on an unconfined supply reel in a magazine held by said spindle, said takeup reel being coaxial with said spindle.

6. A combination as defined in claim 5, further comprising a second spindle for said takeup reel, one of said spindles being hollow and the other being rotatably mounted in said one spindle.

7. In a cinematographic apparatus, particularly in a motion picture projector for use with unconfined supply reels for motion picture film and with supply reels which are confined in magazines, a combination comprising a housing having a rear portion provided with a holder; receiving means provided on said housing adjacent to said holder for removably supporting magazines with supply reels confined therein; drive means provided on said housing and arranged to rotate the supply reel in a magazine which is located in said receiving means in a direction to collect the film; at least one spindle rotatably mounted in said holder and arranged to support unconfirmed supply reels, said spindle being axially movable mounted in said holder for movement between an extended position and a depressed position and being moved to said depressed position in response to the placing of a magazine into said receiving means; a rime mover; and transmission means receiving motion from said prime mover and arranged to rotate said spindle and an unconfined supply reel thereon in a direction to collect the film.

8. A combination as defined in claim 7, further comprising means for permanently biasing said spindle to said extended position in which the spindle can support an unconfined reel.

9. A combination as defined in claim 7, wherein said transmission means comprises clutch means which is disengaged in response to movement of the spindle to said depressed position.

* * * * *